Patented Apr. 6, 1954

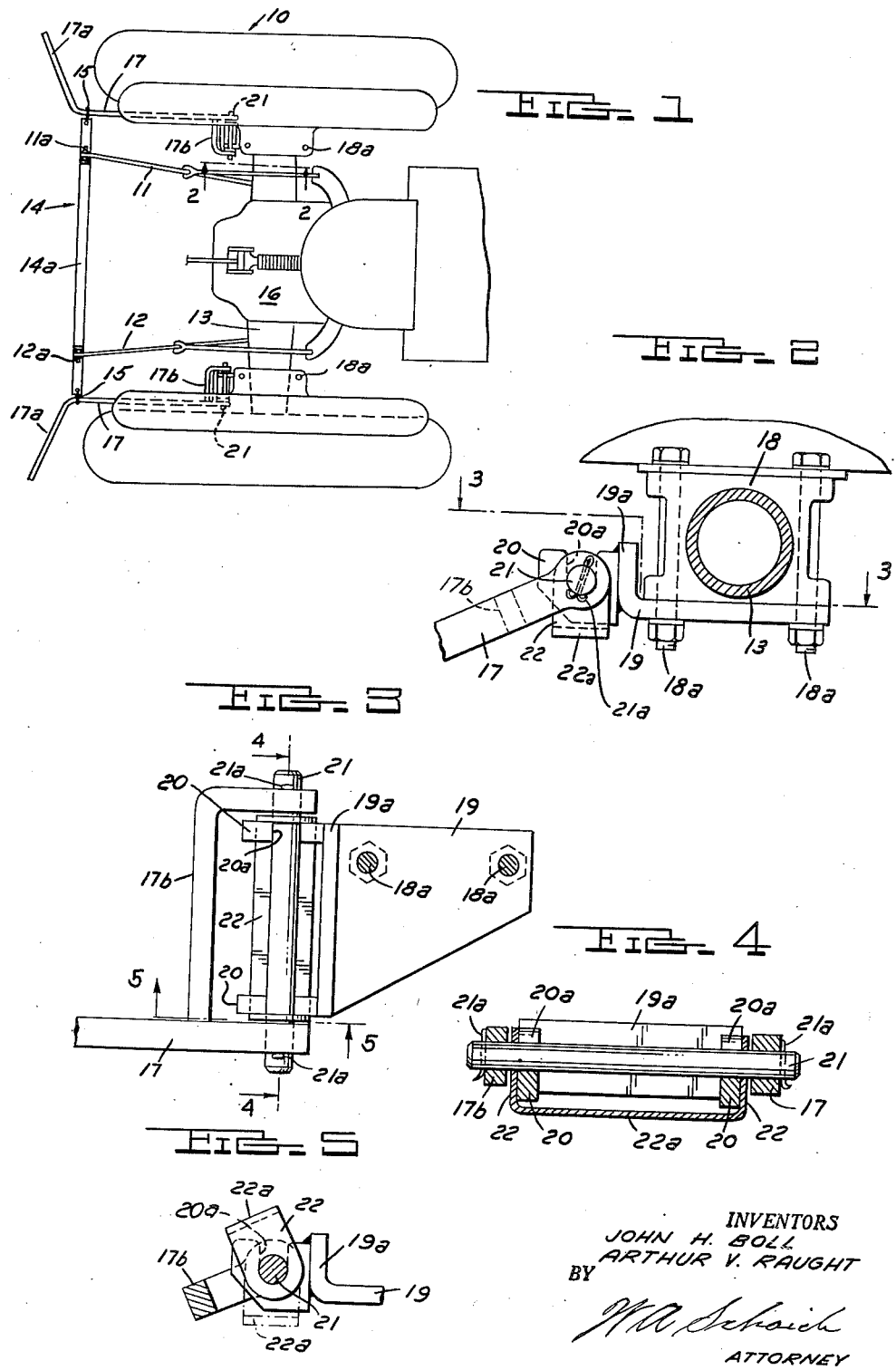

2,674,468

UNITED STATES PATENT OFFICE 2,674,468

IMPLEMENT HITCH

John H. Boll, Dearborn, and Arthur V. Raught, Birmingham, Mich., assignors, by mesne assignments, to Ford Motor Company, Dearborn, Mich., a corporation of Delaware Application October 20, 1951, Serial No. 252,278

1 Claim. (Cl. 280—504)

This invention relates to an improved implement mounting for a tractor to permit rapid attachment or detachment of the implement to the tractor.

Today's tractor is a multi-purpose prime mover useful for harrowing, harvesting, seeding, plowing, cultivating, and other various jobs on the farm. Unfortunately, however, considerable time is consumed in attaching or detaching the various implements to the tractor to permit it to be used for different purposes.

Accordingly, it is an object of this invention to provide an implement mounting for a tractor which permits rapid and convenient mounting or dismounting of the implement to the tractor.

Another object of this invention is to provide a simplified quick attachable mounting for an implement to pivotally secure the implement to the tractor for relative movement in a vertical plane.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a fragmentary plan view of the tractor showing an implement mounted on the tractor by an improved mounting constructed in accordance with this invention;

Figure 2 is an enlarged cross sectional view taken along the plane 2—2 of Figure 1;

Figure 3 is a sectional view taken along the plane 3—3 of Figure 2;

Figure 4 is a detail sectional view taken along the plane 4—4 of Figure 3; and

Figure 5 is a sectional view taken along the plane 5—5 of Figure 3, showing the locking member in its locked position.

As shown on the drawings:

In Figure 1 there is shown the rear end portion of a well-known tractor 10 which has a pair of power-lifted draft links 11 and 12 pivoted at laterally spaced points to the tractor rear axle housing 13. The draft links 11 and 12 are raised by a built-in hydraulic mechanism which is all conventional and need not be described. The trailing ends of draft links 11 and 12 have the usual apertured, spherical type, universally swivelling joints which are respectively mounted on horizontal pins 11a and 12a which are provided on a transverse tool bar 14a of a cultivating implement 14. A pair of earth working tool support arms 17, which may be called implement connecting arms, have their medial portions flexibly secured in depending relationship to tool bar 14. A pair of chains 15 suitably secured respectively to the ends of tool bar 14 and the medial portion of arms 17, conveniently effect such flexible connection. Arms 17 project forwardly and terminate in yoke-like ends 17b for connection to the tractor 10, as will be later described. The rear ends of arms 17 are bent outwardly, as shown at 17a, to permit mounting cultivating sweeps thereon (not shown).

Tractor 10 has a pair of fender mounting brackets 18 respectively secured adjacent the ends of tractor rear axle housing 13 by a pair of bolts 18a, as best shown in Figure 2. A pair of plate-like brackets 19 are respectively mounted on the underside of fender brackets 18, mounting bolts 18a conveniently being utilized to effect such mounting. Brackets 19 have upstanding integrally formed rear ends 19a and a pair of vertical plate-like ears or lugs 20 are respectively welded to such rear ends in transversely spaced alignment. In each ear 20 there is provided a vertically disposed, elongated notch 20a which opens upwardly. All of the notches 20a are disposed in transversely aligned relationship.

Connecting arms 17 have a mounting pin 21 transversely mounted in the yoke-shaped end 17b of such arms. Pins 21 are secured against axial displacement in the yoke-shaped end 17b by a pair of cotter pins 21a respectively provided in suitable holes adjacent the ends of such pin. A U-shaped locking member 22 has its arms transversely apertured to permit such locking member to be pivotally mounted on the pin 21, the arms of such locking member respectively lying against the inner faces of the arms of yoke 17b.

The mounting pins 21 in the yoke ends 17b of connecting arms 17 are respectively insertable in the corresponding pair of aligned notches 20a respectively provided in the ears 20 of brackets 19 with the arms of locking member 22 lying between the ears 20 and the ends of yokes 17b. Hence, the connecting arms 17 may be readily and conveniently connected to the brackets 19 for mounting the implement 14 on the tractor. To engage the mounting pin 21 with notches 20a, it is first necessary, however, to pivot locking member 22 to the upright position shown in Figure 5 whereupon mounting pin 21 may be readily dropped into notches 20a. To prevent displacement of pin 21 from notches 20a, the locking member is then rotated downwardly to the position shown in Figure 2 where the bight portion 22a of locking member 22 then lies substantially adjacent the underside of holes 20. Thus, upward displacement of pin 21 is prevented and hence the connecting arms 17 are pivotally secured to the mounting brackets 19. Obviously, merely rotating the locking member 22 to the upright position shown in Figure 5 permits rapid disassembly of connecting arms 17 from the mounting brackets 19.

It is apparent that the improved mounting of this invention may be utilized with any tractor wherein pivotal mounting of an implement to the tractor is desired and where it is also desirable to provide for rapid and convenient attachment or detachment of the implement and the tractor. In the specific embodiment of this invention, this improved mounting is shown attached to a tractor having power-lifted draft links 11 and 12, such draft links being utilized to raise or lower the implement 14 in a well-known manner. Therefore, in order to complete the dismounting of implement 14 from tractor 10, it is also necessary to disconnect the trailing ends of draft links 11 and 12 from the mounting pins 11a and 12a provided on tool bar 14a.

From the foregoing description, it is clearly apparent that there is here provided an improved implement mounting for a tractor which provides for rapid mounting and dismounting of an implement to the tractor. The implement connecting members are conveniently locked in position to prevent their displacement by a simple yet positive locking arrangement which in no way interferes with the rapid mounting and/or dismounting of the implement to the tractor.

It will, of course, be understood that various details of construction may be varied through a wide range without departing from the principles of this invention and it is, therefore, not the purpose to limit the patent granted hereon otherwise than necessitated by the scope of the appended claim.

We claim:

A quick detachable implement mounting for a tractor comprising a lug element on the tractor, a bracket element mounted on the implement, one of said elements defining an upwardly opening notch, and the other of said elements having a yoke-shaped end with a transverse pin mounted therein, said pin being insertable in and journalled by said notch when said elements are placed in juxtaposition, and a U-shaped locking strap having its arm portions pivotally mounted on said pin outwardly of said one element and its bight portion swingable to a position underlying said one element when said elements are placed in juxtaposition.

References Cited in the file of this patent

UNITED STATES PATENTS

| Number | Name | Date |
|---|---|---|
| 628,255 | Swan | July 4, 1899 |
| 1,923,367 | Gifford | Aug. 22, 1933 |
| 2,176,326 | Brown et al. | Oct. 17, 1939 |
| 2,210,292 | Hodgkin | Aug. 6, 1940 |
| 2,495,928 | Geraldson | Jan. 31, 1950 |